US008146393B2

(12) United States Patent
Katagiri et al.

(10) Patent No.: US 8,146,393 B2
(45) Date of Patent: Apr. 3, 2012

(54) VEHICLE DOOR HANDLE DEVICE

(75) Inventors: Toshiharu Katagiri, Aichi (JP); Yoshiyuki Seki, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 513 days.

(21) Appl. No.: 12/362,732

(22) Filed: Jan. 30, 2009

(65) Prior Publication Data

US 2009/0205383 A1 Aug. 20, 2009

(30) Foreign Application Priority Data

Feb. 19, 2008 (JP) ................................ 2008-037319
Feb. 19, 2008 (JP) ................................ 2008-037320

(51) Int. Cl.
*B60R 25/02* (2006.01)

(52) U.S. Cl. ............ 70/208; 70/423; 70/455; 292/336.3

(58) Field of Classification Search .................... 70/208, 70/423, 424, 427, 428, 455; 292/336.3
See application file for complete search history.

(56) References Cited

U.S. PATENT DOCUMENTS 1,648,251 A * 11/1927 Zygmunt ........................ 70/455
1,652,660 A * 12/1927 Devereaux ...................... 70/210
4,706,478 A * 11/1987 Swan et al. ....................... 70/28
4,798,069 A * 1/1989 DeForrest, Sr. ................. 70/428
5,904,385 A * 5/1999 Linder ....................... 292/336.3
5,984,383 A * 11/1999 Parikh et al. .................. 292/121
6,240,755 B1 * 6/2001 Da Silva ......................... 70/423
6,418,761 B1 * 7/2002 Wytcherley et al. ............ 70/208
6,698,262 B2 * 3/2004 Wittwer .......................... 70/208
6,938,446 B2 9/2005 Fukunaga et al.
7,387,004 B2 * 6/2008 Schutz et al. ................... 70/215
7,401,484 B1 * 7/2008 Holmes et al. .................. 70/423
7,452,010 B2 * 11/2008 Cotton ........................... 292/66
7,526,936 B2 * 5/2009 Niskanen et al. ............... 70/423
7,543,863 B2 * 6/2009 Herbert et al. ............. 292/336.3
7,748,246 B1 * 7/2010 Paige et al. ..................... 70/208
2008/0190157 A1 * 8/2008 Mizuno ........................... 70/455

FOREIGN PATENT DOCUMENTS

JP 2002-129805 A 5/2002

* cited by examiner

*Primary Examiner* — Suzanne Barrett

(74) *Attorney, Agent, or Firm* — Roberts Mlotkowski Safran & Cole, P.C.

(57) ABSTRACT

A vehicle door handle device, includes a cylinder lock for locking and unlocking a locking mechanism of an opening/closing panel, and a pair of pivot members pivotally attached to the opening/closing panel. One pivot member of the pair of pivot members is formed of a shutter capable of opening and closing a key insert hole of the cylinder lock, and another pivot member of the pair of pivot members has a pivotal force transmitting portion for transmitting a pivotal force in a direction to open the key insert hole to the one pivot member and is formed of an operating handle for opening and closing the opening/closing panel.

7 Claims, 15 Drawing Sheets

1 VEHICLE DOOR HANDLE DEVICE
2 DOOR PANEL
3 DOOR HANDLE
4 SHUTTER
5 CYLINDER LOCK
50B KEY INSERTION/ EXTRACTION HOLE
A
2A
3A
3B
30
40
4A
4B
4C
5A
6

K MATCHING KEY
θ1+θ2
1
2
3
4
5
50B
A
2A
3A
3B
30
40
4A
4B
4C
5A
6

VEHICLE DOOR HANDLE DEVICE

The present application is based on Japanese Patent Application No. 2008-037319 and No. 2008-037320 both filed on Feb. 19, 2008, the entire contents of which are incorporated herein by reference.

BACKGROUND OF THE INVENTION

1. Field of the Invention

The present invention relates to a vehicle door handle device, in more particular, to a vehicle door handle device provided with a door panel opened and closed by a manual operation of a door handle.

2. Related Art

As is well known, a vehicle door handle device for opening and closing a door panel by locking or unlocking a door locking mechanism of the door panel is built in a vehicle such as an automobile, etc.

In recent years, this type of vehicle door handle device provided with a function of electrically unlocking a door locking mechanism when an owner (a driver) comes close to a vehicle and electrically locking the door locking mechanism when the driver leaves the vehicle (a smart entry function) has been suggested in order to improve operability of a vehicle.

Such vehicle door handle device is also provided with a function of mechanically locking and unlocking, assuming the case that the electrical locking and unlocking are disabled.

This type of conventional vehicle door handle device provided with a door lock actuator for locking and unlocking by, e.g., switching on/off of an actuator link mechanism housed inside thereof is disclosed by JP-A-2002-129805.

The vehicle door handle device has a handle link mechanism for generating a pivotal motion by a pull-out (pivotal) operation of a door handle, a handle rod for generating a downward linear motion by the pivotal motion of the handle link mechanism, and a coupling lever mechanism for transmitting the linear motion of the handle rod to the above-mentioned actuator link mechanism.

In addition, the vehicle door handle device has a cylinder lock housed in a door handle and having a key rotor which pivots by a pivotal operation by inserting (letting) a regular key (a matching key) into a key insert hole opened at all times, a cylinder lock rod which pivots by a pivotal motion of the key rotor of the cylinder lock, and a key lever mechanism for transmitting the pivotal motion of the cylinder lock rod to the above-mentioned actuator link mechanism.

In such vehicle door handle device, when the key rotor pivots in one direction from a neutral position by an insertion and a subsequent pivotal operation of the matching key in the cylinder lock, the pivotal movement is transmitted to the key lever mechanism via the cylinder lock rod, on/off of the actuator link mechanism in a door lock actuator is switched by an actuation of the key lever mechanism, and the door lock mechanism is changed from a locked state into an unlocked state.

After this, when a door handle is operated in a direction to open a door panel, the pull-out (pivotal) operation of the door handle is transmitted to the handle rod via the handle link mechanism. When the handle rod is linearly moved downward by the pivotal operation of the door handle, the linear movement is transmitted to the actuator link mechanism via the coupling lever mechanism. When the actuator link mechanism is activated, the door panel is opened since the door locking mechanism is in the unlocked state.

On the other hand, when the key rotor pivots in another direction from the neutral position by an insertion and a subsequent pivotal operation of the matching key in the unlocked state of the door locking mechanism, the pivotal movement is transmitted to the key lever mechanism via the cylinder lock rod, then, the actuator link mechanism is activated by the motion of the key lever mechanism, and the door locking mechanism is changed from the unlocked state into the locked state.

However, according to the vehicle door handle device disclosed by JP-A-2002-129805, since the key insert hole of the cylinder lock is opened at all times, there is a problem that rainwater, etc., enters into the cylinder lock from the key insert hole and operation parts, etc., inside the cylinder lock are likely to deteriorate.

THE SUMMARY OF THE INVENTION

Therefore, it is an object of the invention to provide a vehicle door handle device, by which it is possible to prevent rainwater, etc., from entering into a cylinder lock except in the case of locking or unlocking a locking mechanism (using a matching key), and thereby capable of suppressing deterioration of operation parts, etc., inside the cylinder lock due to the rainwater, etc.

(1) According to a feature of the present invention, a vehicle door handle device comprises:

a cylinder lock for locking and unlocking a locking mechanism of an opening/closing panel; and a pair of pivot members pivotally attached to the opening/closing panel, wherein one pivot member of the pair of pivot members is formed of a shutter capable of opening and closing a key insert hole of the cylinder lock; and another pivot member of the pair of pivot members has a pivotal force transmitting portion for transmitting a pivotal force in a direction to open the key insert hole to the one pivot member and is formed of an operating handle for opening and closing the opening/closing panel.

(2) According to a feature of the present invention, a vehicle door handle device comprises:

a cylinder lock for locking and unlocking a locking mechanism of an opening/closing panel; and an operating handle pivotally operably attached to the opening/closing panel and having a shutter for opening and closing a key insert hole of the cylinder lock by a pivotal operation.

(3) According to a feature of the present invention, a vehicle door handle device comprises:

a cylinder lock for locking and unlocking a locking mechanism of a opening/closing panel;

an operating handle pivotally operably attached to the opening/closing panel and having a shutter for opening and closing a key insert hole of the cylinder lock by a pivotal operation; and a handle pivoting restriction mechanism for restricting a pivotal movement in a direction to pivotally return the operating handle.

According to the invention, it is possible to prevent rainwater, etc., from entering into a cylinder lock except in the case of locking or unlocking a locking mechanism, and thereby capable of suppressing deterioration of operation parts, etc., inside the cylinder lock due to the rainwater, etc.

BRIEF DESCRIPTION OF THE DRAWINGS

Next, the present invention will be explained in more detail in conjunction with appended drawings, wherein.

DESCRIPTION OF THE PREFERRED EMBODIMENT

First Embodiment

Figure 1:
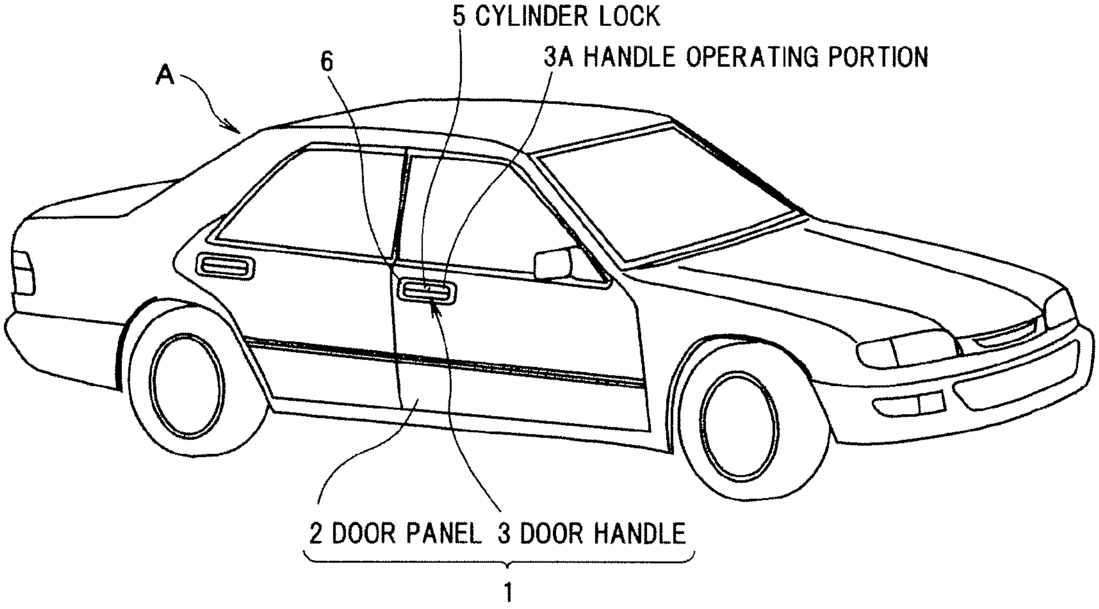
FIG. 1 is a perspective view showing a vehicle with a built-in vehicle door handle device in a first preferred embodiment of the invention.
Figure 2:
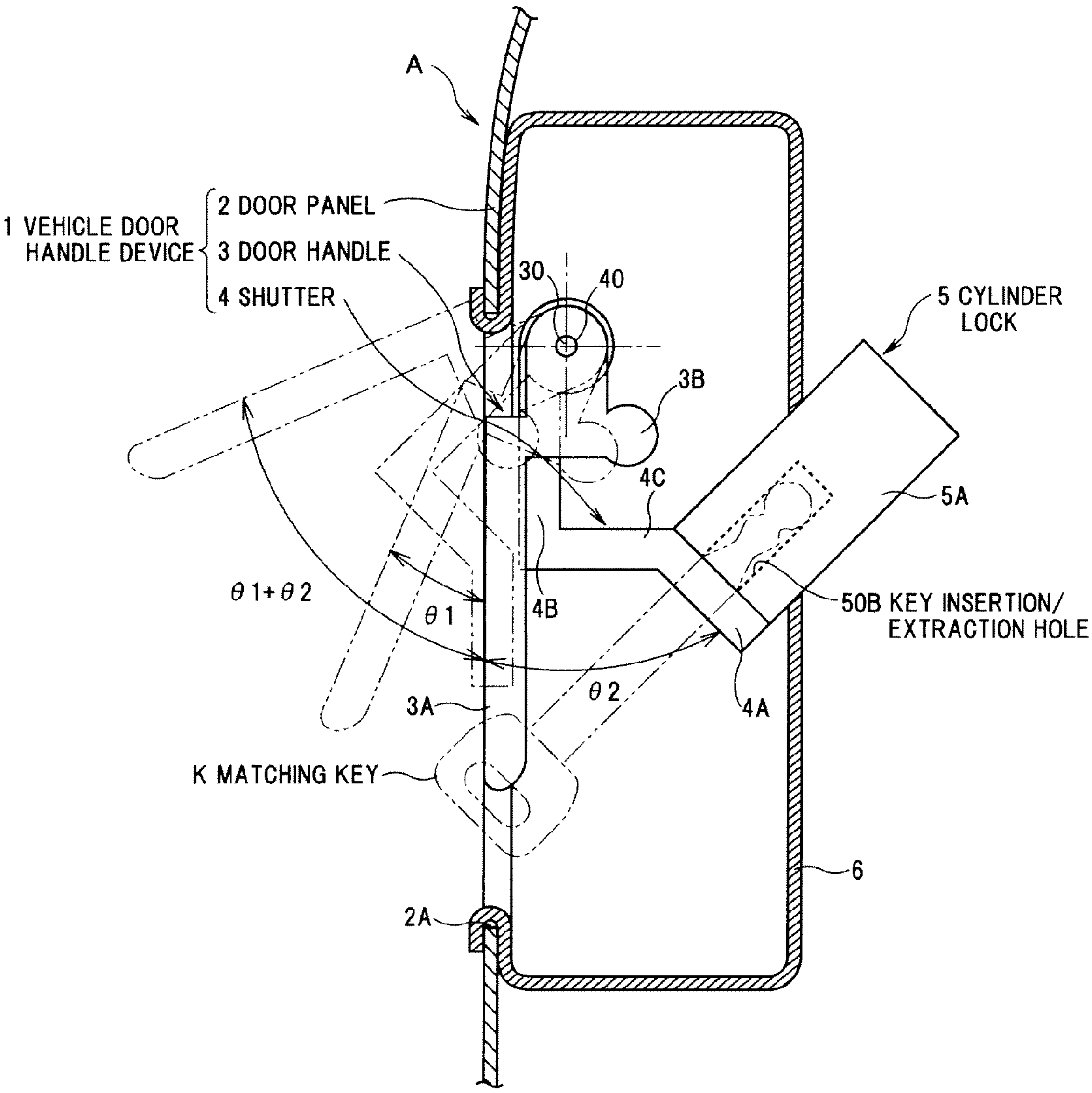
FIG. 2 is an explanatory cross sectional view showing the vehicle door handle device in the first embodiment of the invention.
Figure 3:
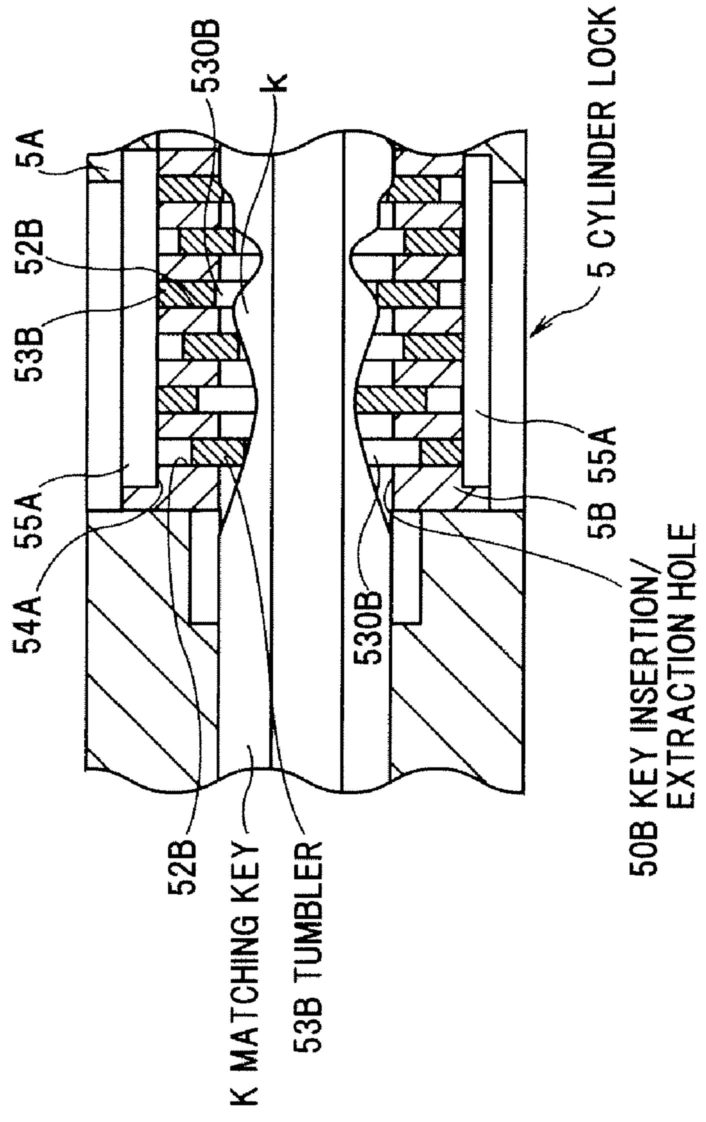
FIG. 3 is a cross sectional view showing a state that a matching key is inserted into a cylinder lock of the vehicle door handle device in the first embodiment of the invention.

FIG. 1 is a perspective view showing a vehicle with a built-in vehicle door handle device in a first preferred embodiment of the invention. FIG. 2 is an explanatory cross sectional view showing the vehicle door handle device in the first embodiment of the invention. FIG. 3 is a cross sectional view showing a state that a matching key is inserted into a cylinder lock of the vehicle door handle device in the first embodiment of the invention.

Total Structure of a Vehicle Door Handle Device

In FIGS. 1 and 2, a vehicle door handle device 1 is composed of a door panel (opening/closing panel) 2 for opening and closing a external door of a vehicle A, a door handle (another pivot member) 3 for operating the door panel 2, and a shutter (one pivot member) 4 having a pivot fulcrum 40 on an axis line passing through a pivot fulcrum 30 of the door handle 3.

Structure of the Door Panel 2

As shown in FIG. 2, the door panel 2 has a cylinder lock 5 for locking and unlocking a door locking mechanism (not shown) and is pivotally installed to a frame (not shown) of the vehicle A. The door panel 2 is allowed to pivot with respect to the frame (body) by an insertion and a subsequent pivotal operation of a matching key K in the cylinder lock 5 (a key insertion/extraction hole 50B) within a predetermined pivoting range. A through window 2A opening inside and outside of the panel is provided in the door panel 2.

As shown in FIG. 3, the cylinder lock 5 is provided with a case 5A as an armor member and a key rotor 5B allowed to pivot by an insertion and a subsequent pivotal operation of the matching key K.

The case 5A is composed of a round box having an internal space 54A which allows the key rotor 5B to be housed therein, and is fixed to the door panel 2. In the case 5A, tumbler fitting holes 55A, 55A opening on an inner peripheral surface thereof and communicating with the internal space 54A, are provided.

The key rotor 5B has a key insertion/extraction hole (key insert hole) 50B which allows the matching key K to be inserted and extracted, and is pivotally housed in the internal space 54A of the case 5A. The key rotor 5B is configured to pivot by a pivotal operation of the matching key K for locking and unlocking a door locking mechanism in an inserted (matched) state of the matching key K into the key insertion/extraction hole 50B.

In the key rotor 5B, plural tumbler aligning holes 52B, 52B, - - - penetrating in a direction orthogonal to an axis line thereof and communicating with the key insertion/extraction hole 50B are provided along a key insertion/extraction direction. In the tumbler aligning holes 52B, 52B, - - - , plural tumblers (key matching member) 53B, 53B, - - - are movably provided in a direction orthogonal to an axis line of the key rotor 5B.

The tumblers 53B, 53B, - - - are arranged in an axial direction of the key rotor 5B at predetermined intervals, and a restoring property is imparted thereto by a tumbler restoring spring (not shown). Key fitting grooves 530B, 530B, - - - fitting to a convex portion k are each provided in the tumblers 53B, 53B, - - - .

Structure of a Door Handle 3

As shown in FIG. 2, the door handle 3 has a handle operating portion 3A and a pivotal force transmitting portion 3B for transmitting a pivotal force in a direction to open the key insertion/extraction hole 50B to the shutter 4. The door handle 3 is pivotally installed to the door panel 2 via a handle bracket 6 and a restoring property is imparted thereto by a handle pivotal restoring spring (not shown). The door handle 3 is allowed to be pivotally operated with respect to the door panel 2 within a predetermined pivoting range (pivot angle <$\theta1+\theta2$>) around the pivot fulcrum 30.

As a result, in the unlocked state of the door locking mechanism, when the door handle 3 is pivotally operated from an initial position indicated by a continuous line in FIG. 2 to a position of a pivot angle $\theta1$ indicated by a two-dot chain line in FIG. 2 and is further operated in a panel opening direction, the door panel 2 is opened. In this case, since the shutter 4 does not receive a pivotal force from the door handle 3 and is located at the initial position indicated by the continuous line in FIG. 2, the key insertion/extraction hole 50B of the cylinder lock 5 is still blocked off.

In addition, in the locked state of the door locking mechanism, when the door handle 3 is further pivotally operated from the position of the pivot angle θ1 indicated by the two-dot chain line in FIG. 2 to a position of a pivot angle (θ1+θ2), the shutter 4 receives a pivotal force in a direction to open the key insertion/extraction hole 50B of the cylinder lock 5 from the door handle 3, thereby pivoting form the initial position indicated by the continuous line in FIG. 2 to a position of a pivot angle θ2 indicated by a two-dot chain line in FIG. 2. In this case, since the key insertion/extraction hole 50B of the cylinder lock 5 is opened when the shutter 4 pivots to the position of the pivot angle θ2 indicated by the two-dot chain line in FIG. 2, it is possible to unlock the door locking mechanism by an insertion and a subsequent pivotal operation of the matching key K into the key insertion/extraction hole 50B.

Structure of the Shutter 4

As shown in FIG. 2, the shutter 4 has a shutter portion 4A for opening and closing the key insertion/extraction hole 50B of the key rotor 5B, a pivotal force receiving portion 4B corresponding to the pivotal force transmitting portion 3B of the door handle 3 and a coupling portion 4C for coupling the pivotal force receiving portion 4B with the shutter portion 4A, and is pivotally arranged in the handle bracket 6 so as to be parallel to the door handle 3. The restoring property is imparted to the shutter 4 by a shutter pivotal restoring spring (not shown). Then, the pivotal force receiving portion 4B receives a pivotal force from the pivotal force transmitting portion 3B of the door handle 3 and the shutter 4 pivots with respect to the door panel 2 within a pivoting range (the pivot angle θ2) of the door handle 3 around the pivot fulcrum 40.

As a result, when the door handle 3 pivots from the initial position thereof to a position indicated by a two-dot chain line in FIG. 2 (a position of the pivot angle <θ1+θ2>), the shutter 4 receives a pivotal force form the pivotal force transmitting portion 3B of the door handle 3 via the pivotal force receiving portion 4B and pivots from the position indicated by the continuous line in FIG. 2 (the initial position) to the position indicated by the two-dot chain line in FIG. 2 (a position of the pivot angle θ2). In this case, when the shutter 4 pivots to the position of the pivot angle θ2, the key insertion/extraction hole 50B is opened.

Operation of the Vehicle Door Handle Device 1

Figures 4A, 4B:
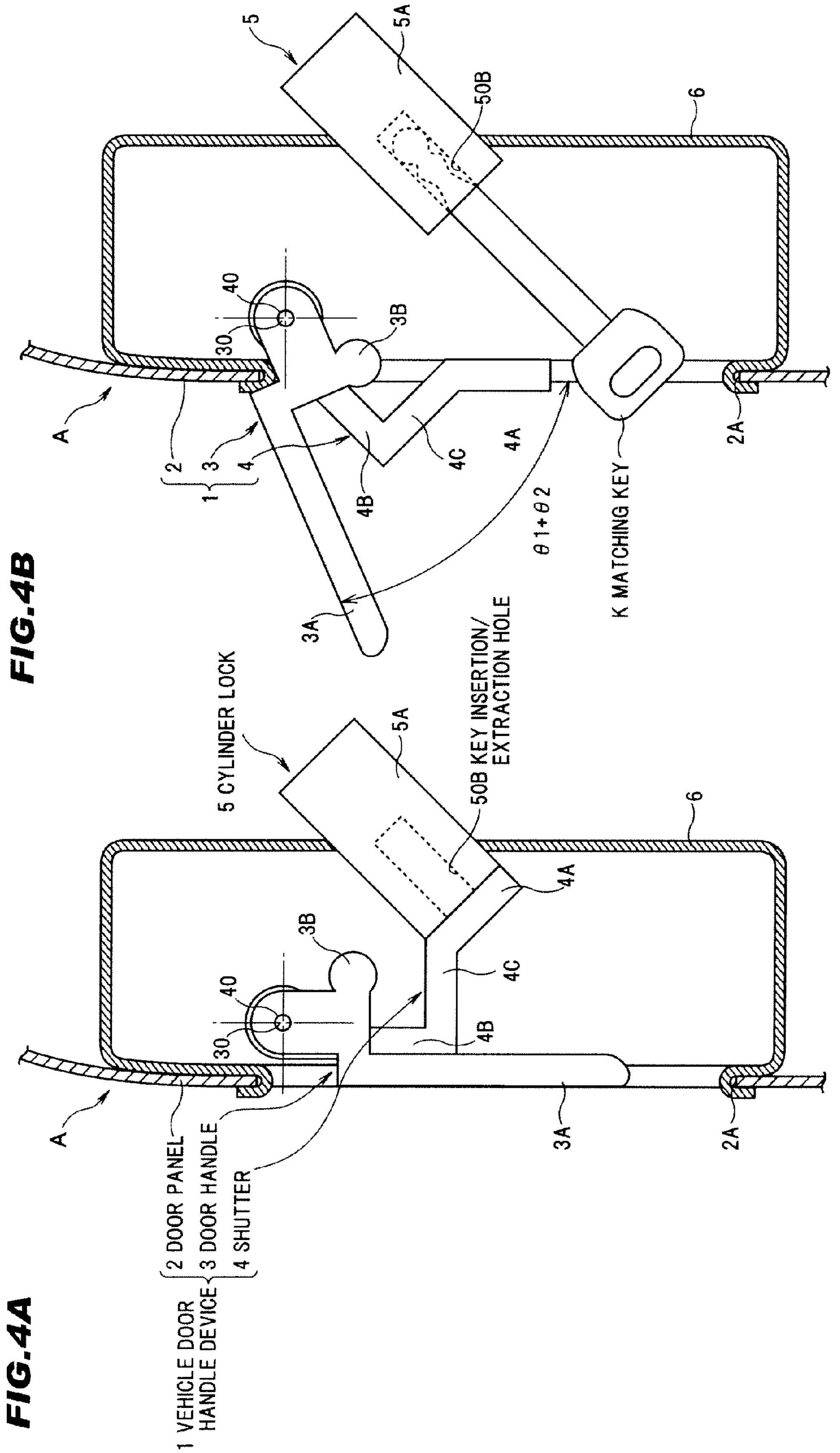
FIGS. 4A and 4B are explanatory cross sectional views showing an operation when a key is inserted into the vehicle door handle device in the first embodiment of the invention.
Figure 5:
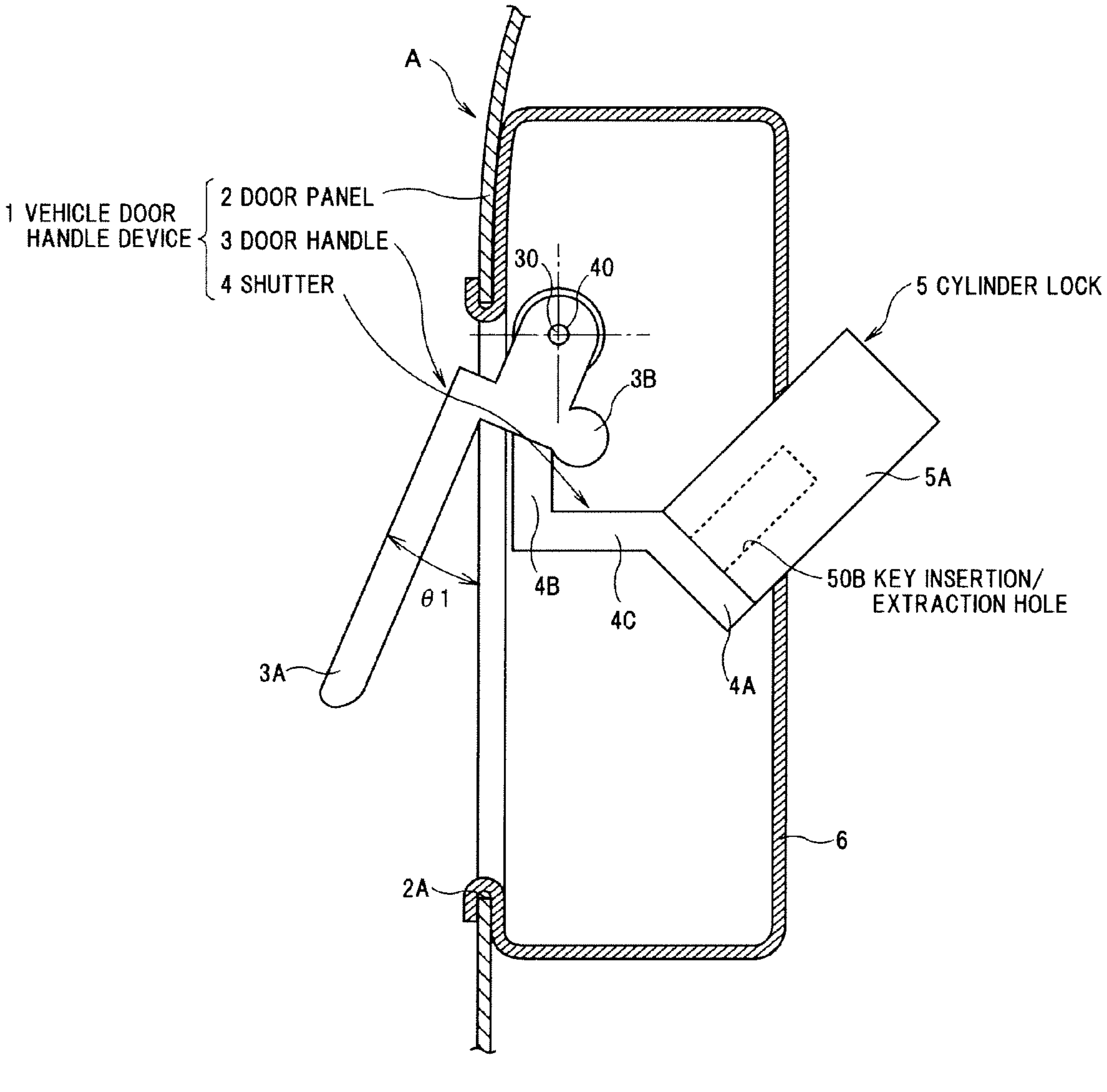
FIG. 5 is an explanatory cross sectional view showing an opening operation of an opening/closing panel in an unlocked state of the vehicle door handle device in the first embodiment of the invention.

Next, the operation of the vehicle door handle device 1 shown in the embodiment will be explained in conjunction with FIGS. 4A, 4B and 5. FIGS. 4A and 4B are explanatory cross sectional views showing an operation when a key is inserted into the vehicle door handle device in the first embodiment of the invention. FIG. 4A shows a non-inserted state of a matching key at the time of pulling out a door handle and FIG. 4B shows an inserted state of the matching key at the time of pulling out the door handle, respectively. FIG. 5 is an explanatory cross sectional view showing an opening operation of an opening/closing panel in an unlocked state of the vehicle door handle device in the first embodiment of the invention.

Firstly, in order to switch the door locking mechanism from the locked state to the unlocked state in a closed state of the door panel 2, the door handle 3 is pulled out (pivotally operated) from an initial position shown in FIG. 4A to a pivotal position (a pivotal position of the pivot angle <θ1+θ2>) shown in FIG. 4B.

In this case, when the door handle 3 is pivotally operated in a clockwise direction from the initial position thereof toward the pivotal position of the pivot angle θ1 (shown in FIG. 2), the pivotal force transmitting portion 3B contacts with the pivotal force receiving portion 4B of the shutter 4 at the position of the pivot angle θ1. Then, when door handle 3 is further pivotally operated from the pivotal position of the pivot angle θ1 toward that of the pivot angle (θ1+θ2), the shutter 4 pivots with the door handle 3 in a clockwise direction from the initial position thereof to the pivotal position of the pivot angle θ2 (shown in FIG. 2) (the door handle 3 is at the pivotal position of the pivot angle <θ1+θ2>) by receiving the pivotal force from the door handle 3 (the pivotal force transmitting portion 3B), thereby opening the key insertion/extraction hole 50B of the cylinder lock 5 (a key rotor 50).

Next, when the matching key K is inserted into the key insertion/extraction hole 50B of the key rotor 5B, the key fitting grooves 530B, 530B, - - - of the tumblers 53B, 53B, - - - are engaged with the convex portion k of the matching key K at each corresponding position, accordingly, the tumblers 53B, 53B, - - - are withdrawn from the tumbler fitting holes 55A, 55A, which results in a pivotal state of the key rotor 5B.

Then, the matching key K is pivotally moved in a direction to release the locked state of the door locking mechanism. In this case, when the matching key K pivots, the pivotal force is transmitted to the door locking mechanism via a lever (not shown), accordingly, the door locking mechanism is switched from the locked state to the unlocked state.

After this, when the door handle 3 is operated in a direction to open the door panel 2 again, the door panel 2 is opened since the door locking mechanism is in the unlocked state.

In contrast, in the case that the door locking mechanism is unlocked in the closed state of the door panel 2, when the door handle 3 is pulled out (pivotally operated) from the initial position shown in FIG. 4A to the pivotal position (a pivotal position of the pivot angle θ1) shown in FIG. 5 and is further operated in a panel opening direction, the door panel 2 is opened.

On the other hand, in order to switch the door locking mechanism from the unlocked state to the locked state in the closed state of the door panel 2, the door panel 2 is opened by pulling out (pivotally operating) the door handle 3 from the initial position shown in FIG. 4A to the pivotal position (a pivotal position of the pivot angle <θ1+θ2>) shown in FIG. 4B, the matching key K is sequentially inserted into the key insertion/extraction hole 50B of the key rotor 5B, and then, the door panel 2 is closed by pivotally operating the matching key K in a direction to lock the door locking mechanism.

Effect of the First Embodiment

According to the above-mentioned first embodiment, following effect can be obtained.

It is possible to prevent rainwater, etc., from entering into the cylinder lock 5 by blocking off the key insertion/extraction hole 50B of the cylinder lock 5 (the key rotor 50) except in the case of locking or unlocking the locking mechanism, and it is thereby possible to suppress deterioration of operation parts, etc., inside the cylinder lock due to the rainwater, etc.

Second Embodiment

Figure 6:
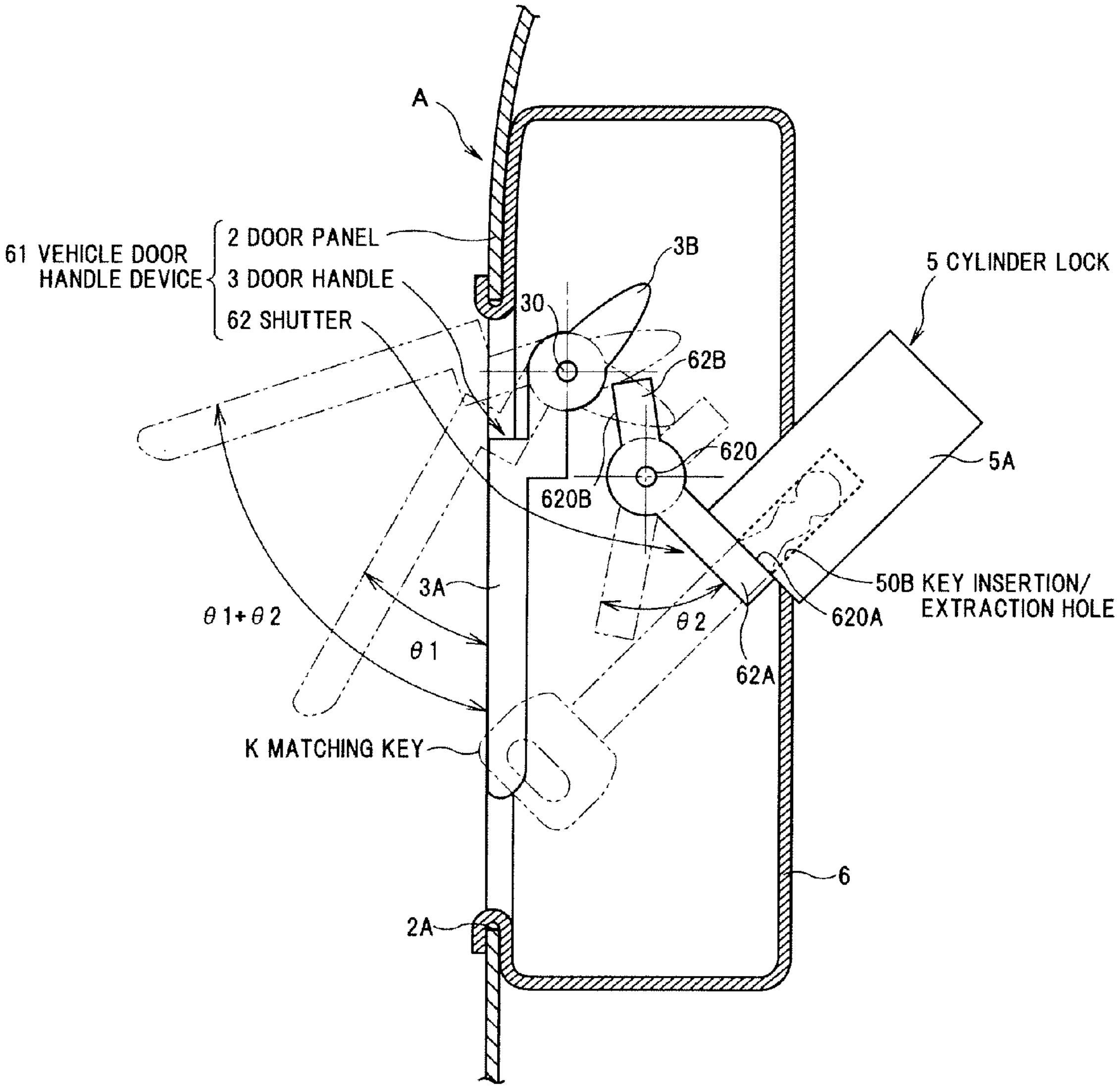
FIG. 6 is an explanatory cross sectional view showing a vehicle door handle device in a second preferred embodiment of the invention.

FIG. 6 is an explanatory cross sectional view showing a vehicle door handle device in a second preferred embodiment of the invention. In FIG. 6, the members same as or equivalent to FIG. 2 are given the same reference numbers and the explanation will be omitted.

As shown in FIG. 6, a vehicle door handle device 61 in the second embodiment is characterized in that a shutter 62 as one pivot member is composed of a first arm 62A and a second arm 62B.

Therefore, a shutter portion 620A for opening and closing the key insertion/extraction hole 50B of the cylinder lock 5

(the key rotor 50) is provided on the first arm 62A, and a pivotal force receiving portion 620B corresponding the pivotal force transmitting portion (cam portion) 3B of the door handle 3 is provided on the second arm 62B, respectively.

A pivot fulcrum 620 of the shutter 62 located on an axis line parallel to an axis line passing through the pivot fulcrum 30 of the door handle 3 is arranged between the first arm 62A and the second arm 62B.

Operation of the Vehicle Door Handle Device 61

Figure 7B:
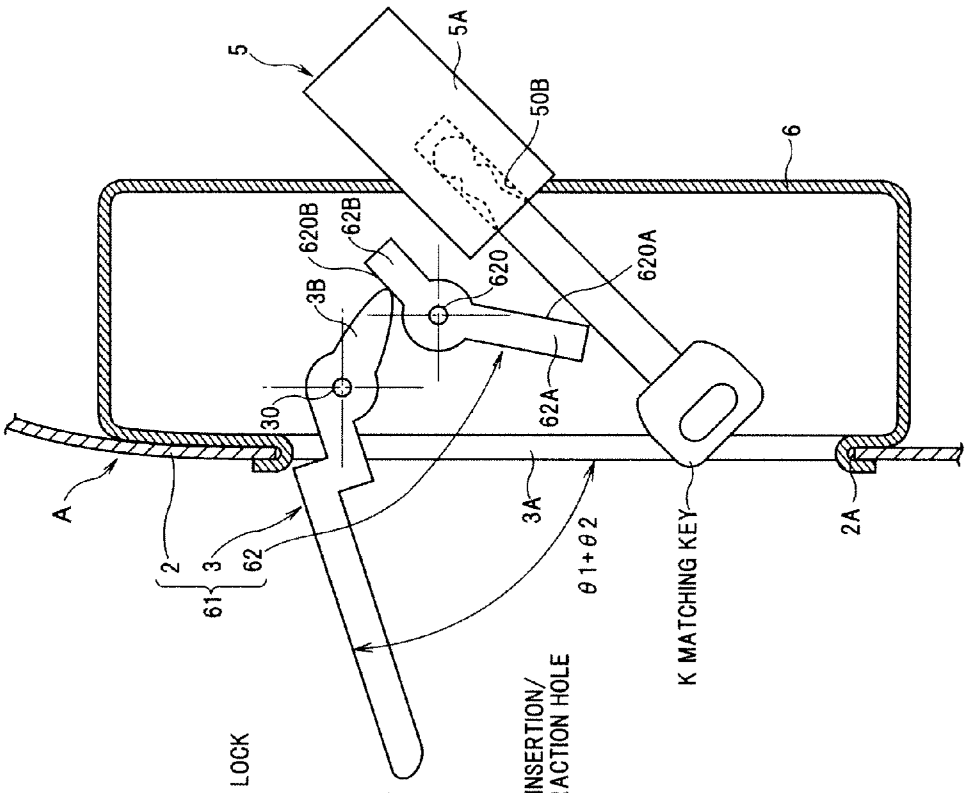
FIGS. 7A and 7B are explanatory cross sectional views showing an operation when a key is inserted into the vehicle door handle device in the second embodiment of the invention.
Figure 7A:
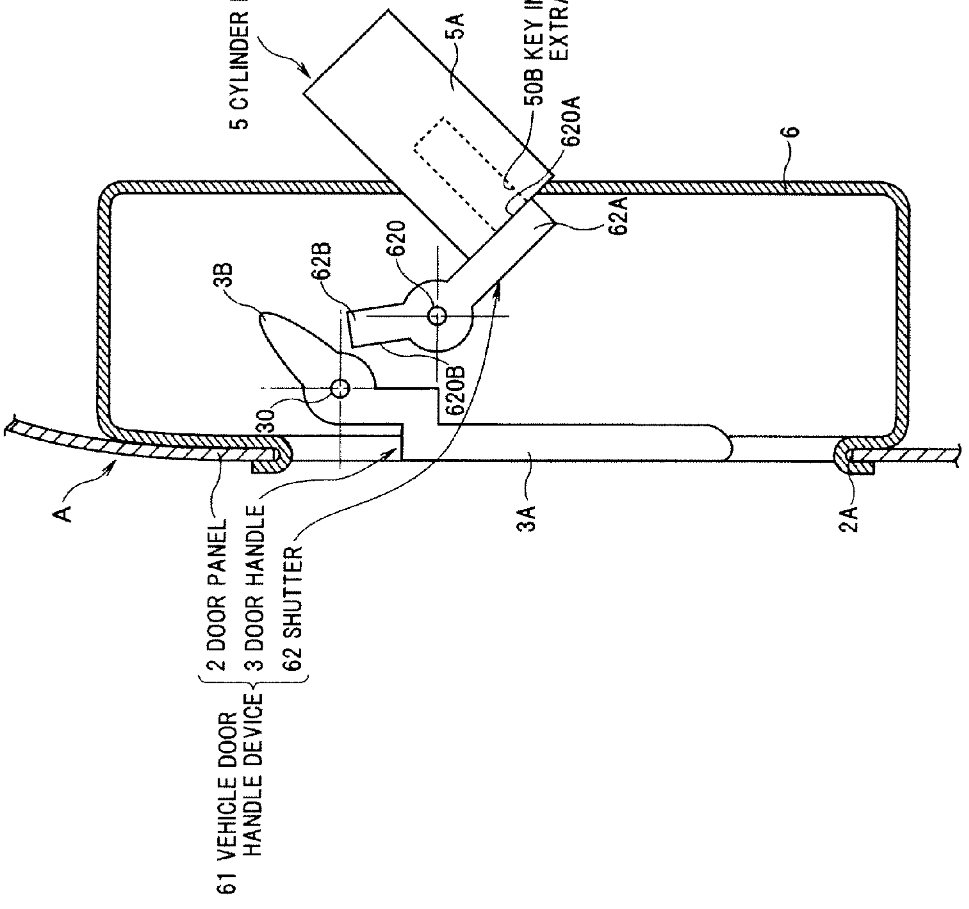
Figure 8:
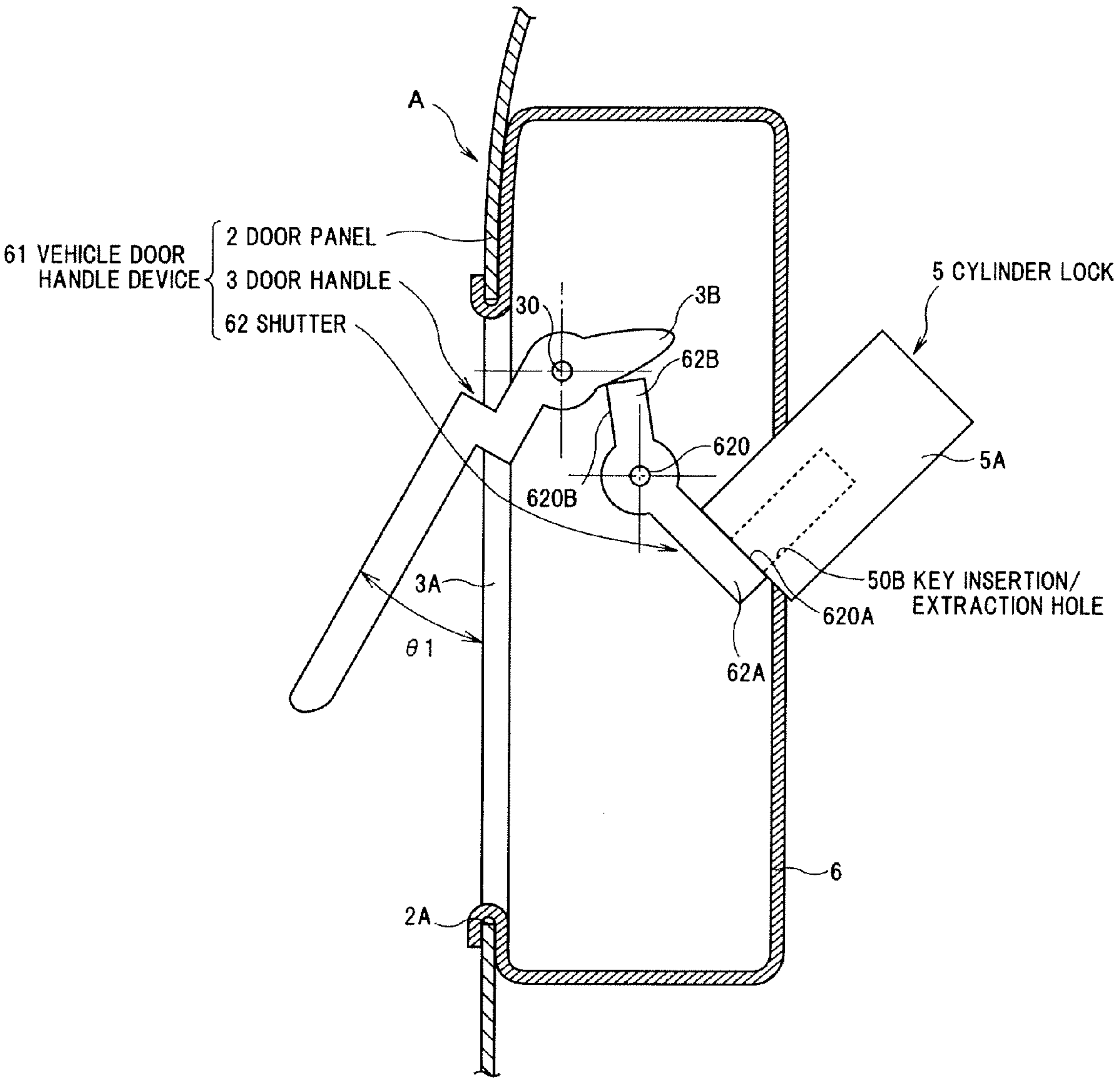
FIG. 8 is an explanatory cross sectional view showing an opening operation of an opening/closing panel in an unlocked state of the vehicle door handle device in the second embodiment of the invention.

Next, the operation of the vehicle door handle device 61 in the embodiment will be explained in conjunction with FIGS. 7A, 7B and 8. FIGS. 7A and 7B are explanatory cross sectional views showing an operation when a key is inserted into the vehicle door handle device in the second embodiment of the invention. FIG. 7A shows a non-inserted state of a matching key at the time of pulling out a door handle and FIG. 7B shows an inserted state of the matching key at the time of pulling out a door handle, respectively. FIG. 8 is an explanatory cross sectional view showing an opening operation of an opening/closing panel in an unlocked state of the vehicle door handle device in the second embodiment of the invention.

Firstly, in order to switch the door locking mechanism from the locked state to the unlocked state in a closed state of the door panel 2, the door handle 3 is pulled out (pivotally operated) from an initial position shown in FIG. 7A to a pivotal position (a pivotal position of the pivot angle <$\theta$1+$\theta$2>) shown in FIG. 7B.

In this case, when the door handle 3 is pivotally operated in a clockwise direction from the initial position thereof toward the pivotal position of the pivot angle $\theta$1 (shown in FIG. 6), the pivotal force transmitting portion 3B contacts with the pivotal force receiving portion 620B of the shutter 62 at the position of the pivot angle $\theta$1. Then, when door handle 3 is further pivotally operated from the pivotal position of the pivot angle $\theta$1 toward that of the pivot angle ($\theta$1+$\theta$2), the shutter 62 pivots with the door handle 3 in a clockwise direction from the initial position thereof to the pivotal position of the pivot angle $\theta$2 (shown in FIG. 6) (the door handle 3 is at the pivotal position of the pivot angle <$\theta$1+$\theta$2>) by receiving the pivotal force from the door handle 3 (the pivotal force transmitting portion 3B), thereby opening the key insertion/extraction hole 50B of the cylinder lock 5 (a key rotor 50).

Next, when the matching key K is inserted into the key insertion/extraction hole 50B of the key rotor 5B, the key fitting grooves 530B, 530B, - - - of the tumblers 53B, 53B, - - - are engaged with the convex portion k of the matching key K at each corresponding position, accordingly, the tumblers 53B, 53B, - - - are withdrawn from the tumbler fitting holes 55A, 55A, which results in a pivotal state of the key rotor 5B.

Then, the matching key K is pivotally moved in a direction to release the locked state of the door locking mechanism. In this case, when the matching key K pivots, the pivotal force is transmitted to the door locking mechanism via a lever (not shown), accordingly, the door locking mechanism is switched from the locked state to the unlocked state.

After this, when the door handle 3 is operated in a direction to open the door panel 2 again, the door panel 2 is opened since the door locking mechanism is in the unlocked state.

In contrast, in the case that the door locking mechanism is unlocked in the closed state of the door panel 2, when the door handle 3 is pulled out (pivotally operated) from the initial position shown in FIG. 7A to the pivotal position (a pivotal position of the pivot angle $\theta$1) shown in FIG. 8 and is further operated in a panel opening direction, the door panel 2 is opened.

On the other hand, in order to switch the door locking mechanism from the unlocked state to the locked state in the closed state of the door panel 2, the door panel 2 is opened by pulling out (pivotally operating) the door handle 3 from the initial position shown in FIG. 7A to the pivotal position (a pivotal position of the pivot angle <$\theta$1+$\theta$2>) shown in FIG. 7B, the matching key K is sequentially inserted into the key insertion/extraction hole 50B of the key rotor 5B, and then, the door panel 2 is closed by pivotally operating the matching key K in a direction to lock the door locking mechanism.

Effect of the Second Embodiment

According to the above-mentioned second embodiment, it is possible to obtain the same effect as the first embodiment.

Third Embodiment

Figure 9:
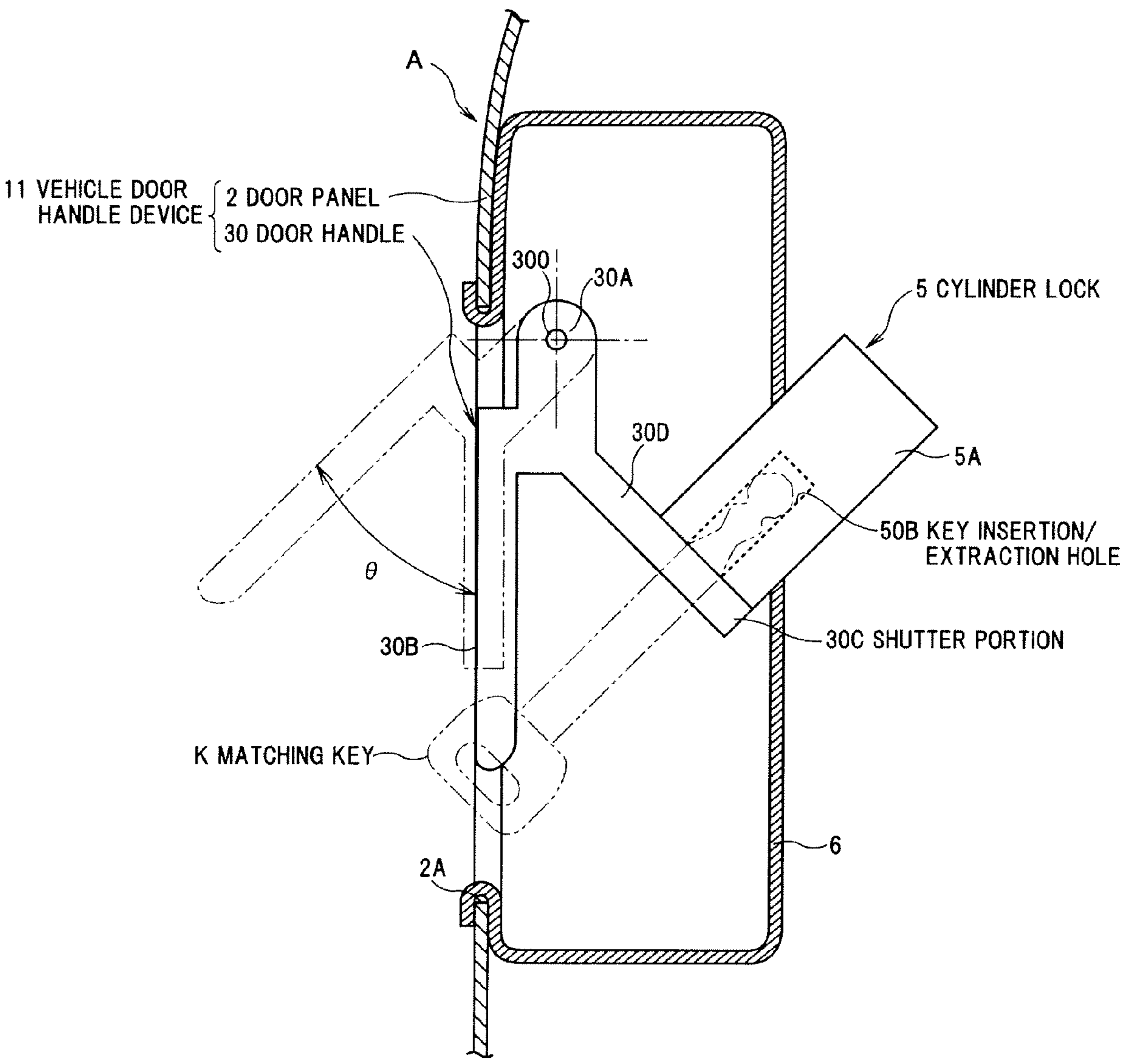
FIG. 9 is an explanatory cross sectional view showing a vehicle door handle device in a third preferred embodiment of the invention.

FIG. 9 is an explanatory cross sectional view showing a vehicle door handle device in a third preferred embodiment of the invention. In FIG. 9, the members same as or equivalent to FIG. 2 are given the same reference numbers and the explanation will be omitted.

As shown in FIG. 9, a vehicle door handle device 11 in the third embodiment is characterized in that a door handle (operating handle) 30 having a shutter portion (shutter) 30C for opening and closing the key insertion/extraction hole 50B of the cylinder lock 5 by a pivotal operation is provided.

Therefore, as shown in FIG. 9, the door handle 30 has a distal end 30A and an operating portion 30B in addition to the shutter portion 30C, is pivotally installed to the door panel 2 via the handle bracket 6, and a restoring property is imparted thereto by a handle pivotal restoring spring (not shown). The door handle 30 is allowed to be pivotally operated with respect to the door panel 2 within a predetermined pivoting range $\theta$ around a pivot fulcrum 300.

The distal end 30A has the pivot fulcrum 300 on one end side (the upper side in FIG. 9), and is arranged in the door panel 2.

The operating portion 30B is composed of a handle grip portion which is exposed outside and has a substantially L-shaped cross-section, and is integrally formed on another end (free end) side of the distal end 30A.

The shutter portion 30C is arrange on a vehicle interior side of the operating portion 30B, and is integrally provided on the free end side of the distal end 30A via a coupling portion 30D. The shutter portion 30C is configured to block off the key insertion/extraction hole 50B of the cylinder lock 5 in an initial state of the door handle 30 as indicated by a continuous line in FIG. 9, and to open the key insertion/extraction hole 50B of the cylinder lock 5 by pivoting with the door handle 30 from the initial state to a position of a pivot angle $\theta$ as indicated by a two-dot chain line in FIG. 9.

Operation of the Vehicle Door Handle Device 11

Figure 10B:
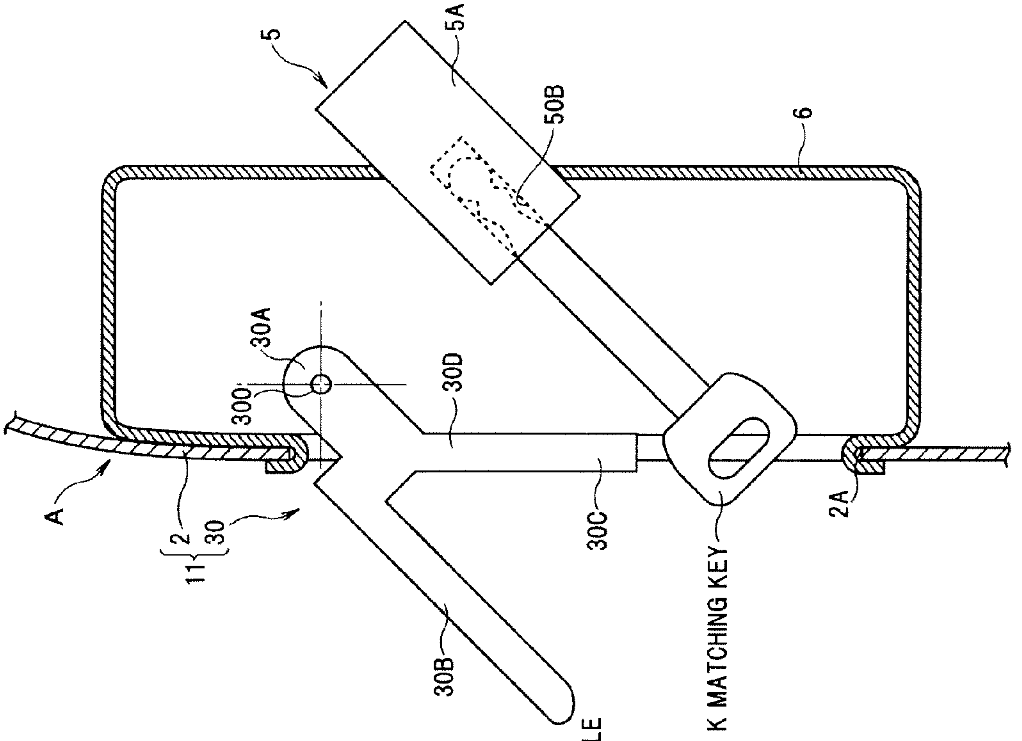
FIGS. 10A and 10B are explanatory cross sectional views showing an operation of the vehicle door handle device in the third embodiment of the invention.
Figure 10A:
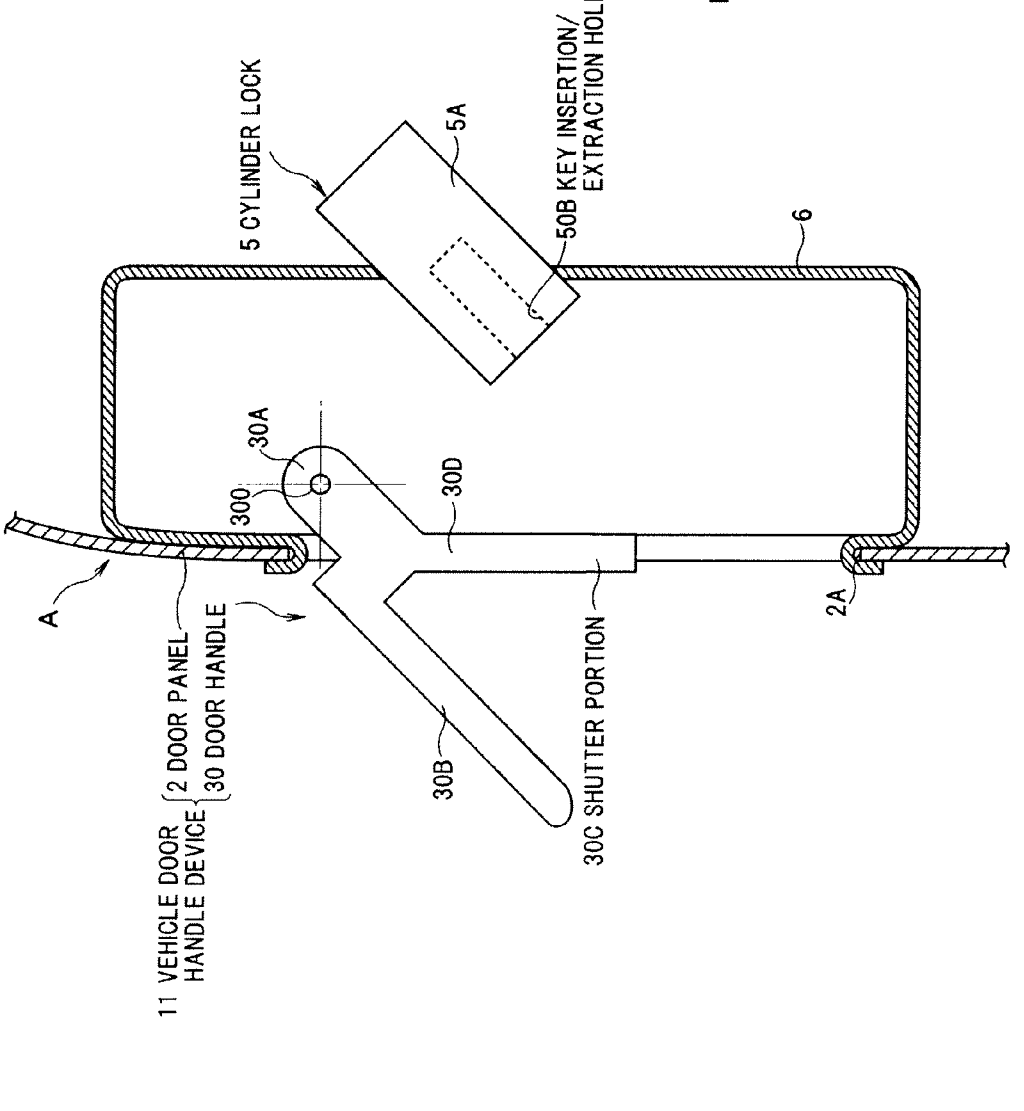

Next, the operation of the vehicle door handle device 11 shown in the embodiment will be explained in conjunction with FIGS. 10A and 10B. FIGS. 10A and 10B are explanatory cross sectional views showing an operation of the vehicle door handle device in the third embodiment of the invention. FIG. 10A shows a non-inserted state of a matching key at the time of pulling out a door handle and FIG. 10B shows an inserted state of the matching key at the time of pulling out the door handle, respectively.

In order to switch the door locking mechanism from the locked state to the unlocked state in a closed state of the door panel 2, the door handle 30 is pulled out (pivotally operated) as shown in FIG. 10A, thereby pivoting the operating portion 30B with the distal end 30A. In this case, when the shutter portion 30C pivots, the key insertion/extraction hole 50B of the cylinder lock 5 (the key rotor 5B) is opened.

Next, as shown in FIG. 10B, when the matching key K is inserted into the key insertion/extraction hole 50B of the key rotor 5B, the key fitting grooves 530B, 530B, - - - of the tumblers 53B, 53B, - - - are engaged with the convex portion k of the matching key K at each corresponding position, accordingly, the tumblers 53B, 53B, - - - are withdrawn from the tumbler fitting holes 55A, 55A, which results in a pivotal state of the key rotor 5B.

Then, the matching key K is pivotally moved in a direction to release the locked state of the door locking mechanism. In this case, when the matching key K pivots, the pivotal force is transmitted to the door locking mechanism via a lever (not shown), accordingly, the door locking mechanism is switched from the locked state to the unlocked state.

After this, when the door handle 30 is operated in a direction to open the door panel 2 again, the door panel 2 is opened since the door locking mechanism is in the unlocked state.

On the other hand, in order to switch the door locking mechanism from the unlocked state to the locked state in the closed state of the door panel 2, the door panel 2 is opened by pulling out (pivotally operating) the door handle 3 as shown in FIG. 10A, the matching key K is sequentially inserted into the key insertion/extraction hole 50B of the key rotor 5B as shown in FIG. 10B, and then, the door panel 2 is closed by pivotally operating the matching key K in a direction to lock the door locking mechanism.

Effect of the Third Embodiment

According to the above-mentioned third embodiment, it is possible to obtain the same effect as the first embodiment. Namely, since the key insertion/extraction hole 50B of the cylinder lock 5 is blocked off by the shutter portion 30C when the locking or unlocking of the door locking mechanism is not being conducted, it is possible to prevent rainwater, etc., from entering into the cylinder lock 5 except in the case of using the matching key K, and it is thereby possible to suppress deterioration of functions in the cylinder lock 5 due to the rainwater, etc.

Fourth Embodiment

Figure 11:
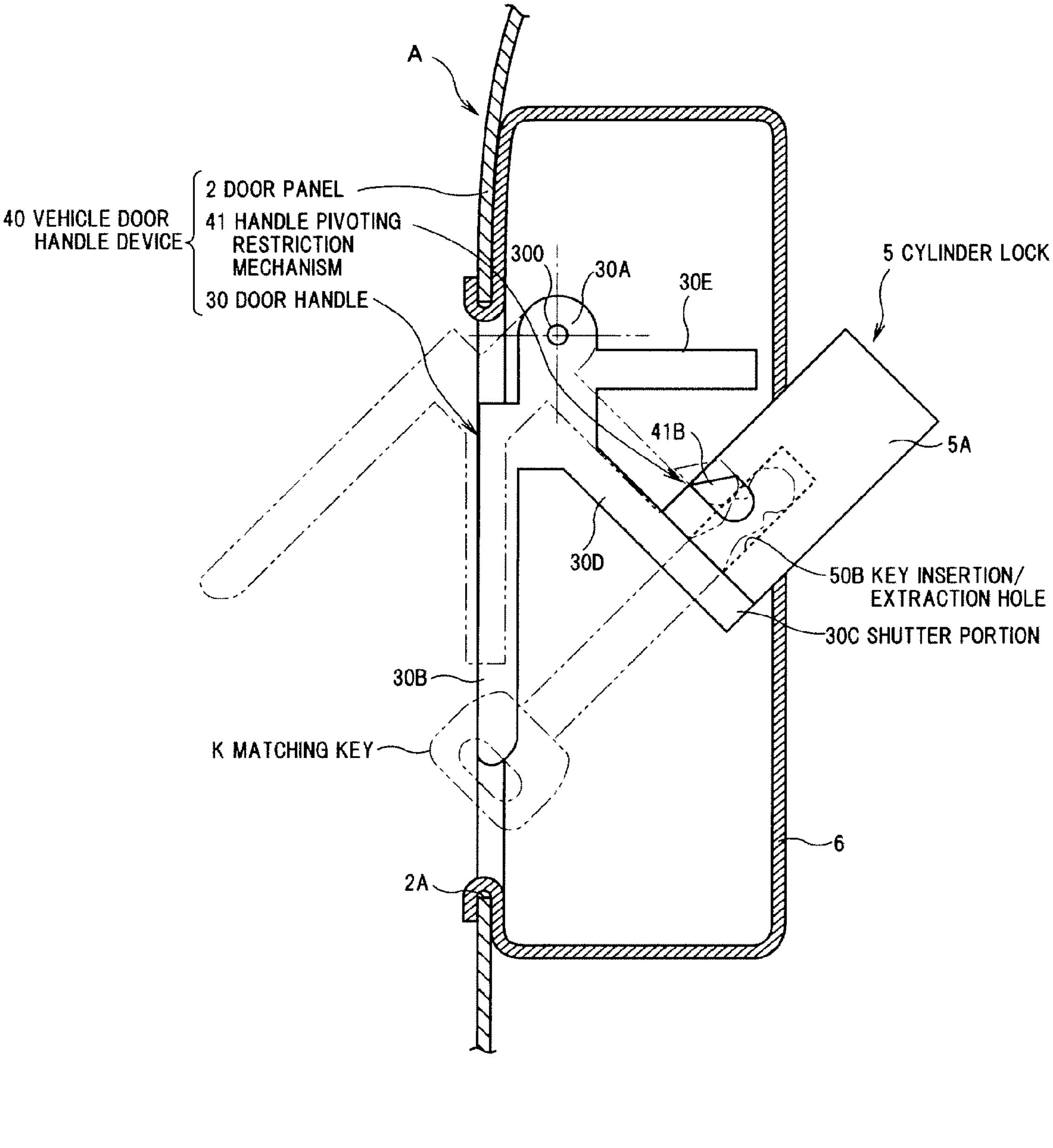
FIG. 11 is an explanatory cross sectional view showing a vehicle door handle device in a fourth preferred embodiment of the invention.
Figure 12:
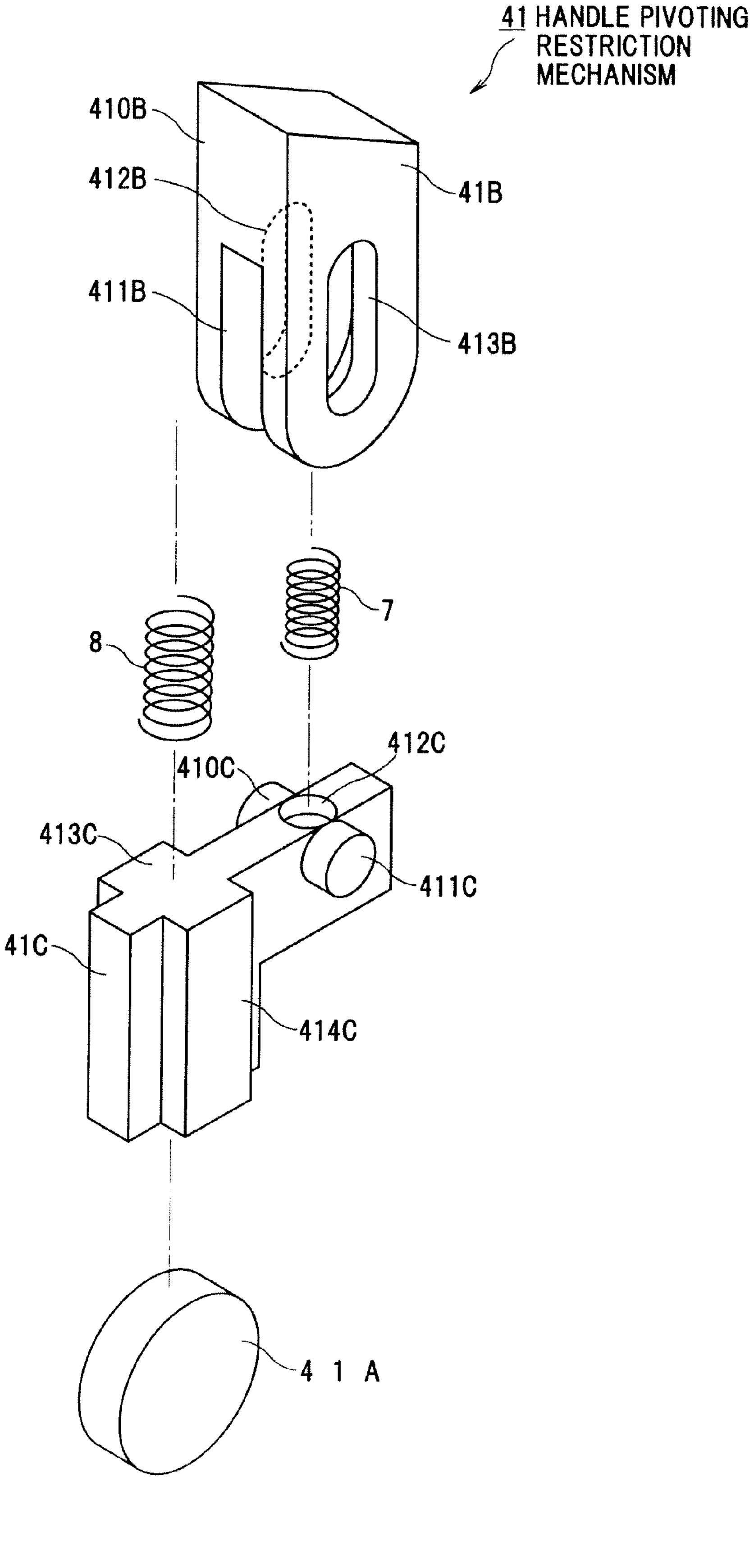
FIG. 12 is an explanatory exploded perspective view showing a handle pivoting restriction mechanism of the vehicle door handle device in the fourth embodiment of the invention.
Figure 13:
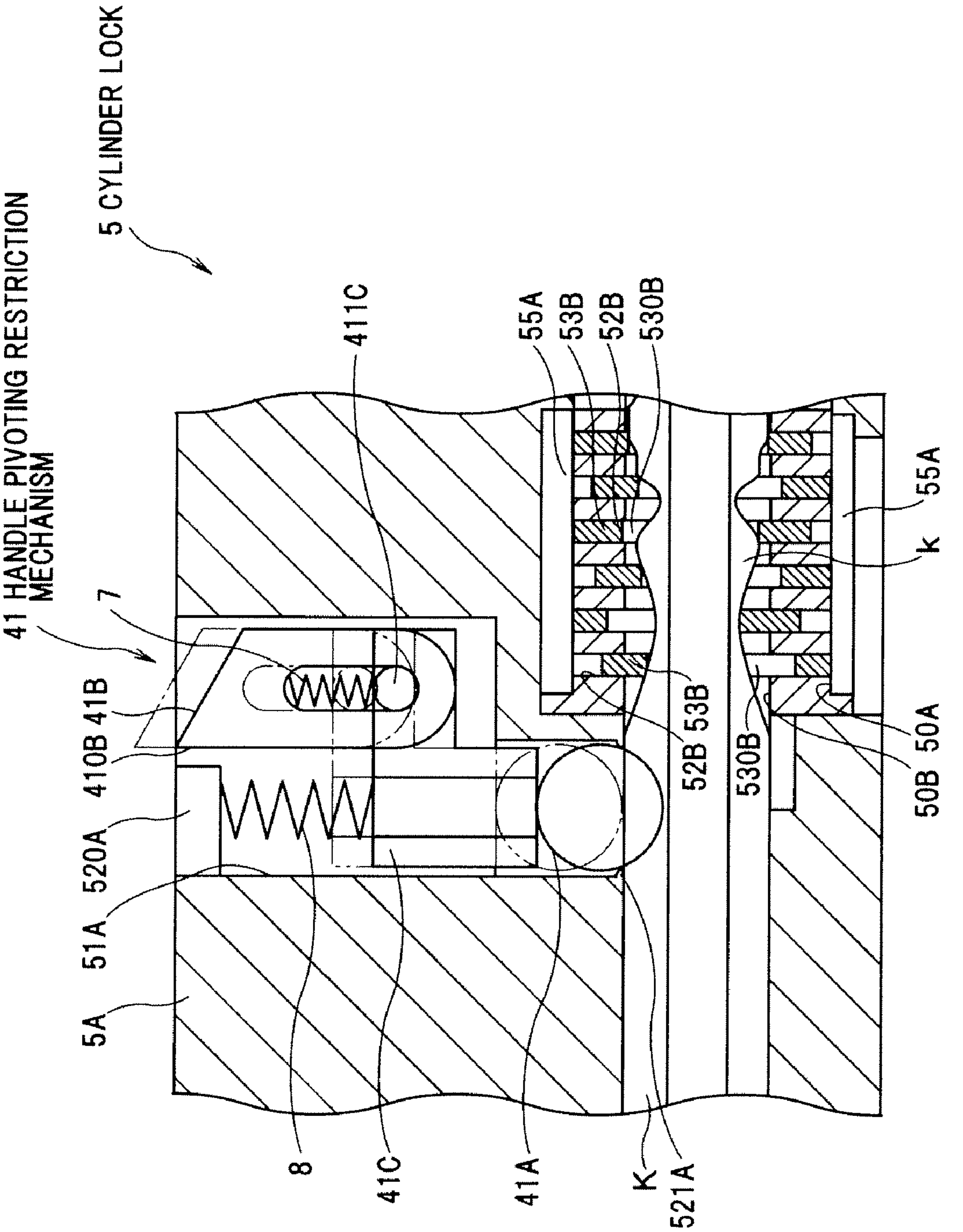
FIG. 13 is an explanatory cross sectional view showing the handle pivoting restriction mechanism of the vehicle door handle device in the fourth embodiment of the invention.

FIG. 11 is an explanatory cross sectional view showing a vehicle door handle device in a fourth preferred embodiment of the invention. FIG. 12 is an explanatory exploded perspective view showing a handle pivoting restriction mechanism of the vehicle door handle device in the fourth embodiment of the invention. FIG. 13 is an explanatory cross sectional view showing the handle pivoting restriction mechanism of the vehicle door handle device in the fourth embodiment of the invention. In FIGS. 11 to 13, the members same as or equivalent to FIGS. 3 and 9 are given the same reference numbers and the explanation will be omitted.

As shown in FIGS. 11 to 13, a vehicle door handle device 40 in the fourth embodiment is characterized in that a handle pivoting restriction mechanism 41 for restricting a pivotal motion in a direction to pivotally return the door handle 30 is provided.

Therefore, the case 5A of the cylinder lock 5 is composed of a round box having a first internal space 50A which allows the key rotor 5B to be housed therein and a second internal space 51A communicating with the first internal space 50A, and is fixed to the door panel 2. The second internal space 51A is opened on an outer peripheral surface of the case 5A. In the second internal space 51A, a spring receiving portion 520A for blocking off a portion of an outer opening is installed and an annular piece receiving portion 521A for blocking off a portion of an inner opening is provided. In addition, in the case 5A, tumbler fitting holes 55A, 55A opening on an inner peripheral surface thereof and communicating with the first internal space 50A, are provided.

The key rotor 5B has a key insertion/extraction hole (key insert hole) 50B which opens on the second internal space 51A and allows the matching key K to be inserted and extracted, and is pivotally housed in the first internal space 50A of the case 5A. The key rotor 5B is configured to pivot by a pivotal operation of the matching key K for locking and unlocking a door locking mechanism in an inserted (matched) state of the matching key K into the key insertion/extraction hole 50B.

The door handle 30 has the distal end 30A, the operating portion 30B, the shutter portion 30C and a handle stopper 30E, is pivotally installed to the door panel 2 via the handle bracket 6, and a restoring property is imparted thereto by a handle pivotal restoring spring (not shown). The door handle 30 is allowed to be pivotally operated with respect to the door panel 2 within a predetermined pivoting range around a pivot fulcrum 300. The handle stopper 30E is integrally provided on one end side of the distal end 30A (end of pivot fulcrum side), and is arranged on a vehicle interior side of the operating portion 30B.

The handle pivoting restriction mechanism 41 is composed of a slide piece 41A moved forward and backward by an insertion/extraction of the matching key K into/from the key insertion/extraction hole 50B, a pivot restricting piece 41B emerged by the movement of the slide piece 41A, and a plunger block 41C for imparting a moving force of the slide piece 41A to the pivot restricting piece 41B as an ejecting force, and is arranged in the first internal space 50A (the key insertion/extraction hole 50B) and the second internal space 51A of the case 5A.

The slide piece 41A is housed across the key insertion/extraction hole 50B of the key rotor 5B and the second internal space 51A, and is formed of a plate having an entirely substantially plane circular shape. The slide piece 41A is arranged in a position in which a portion thereof faces inside of the key insertion/extraction hole 50B in a state that the matching key K is not inserted into the key insertion/extraction hole 50B. In addition, the slide piece 41A is configured to press the plunger block 41C to the pivot restricting piece side by receiving a pressing force from a one side edge of the matching key K in a state that the matching key K is inserted into the key insertion/extraction hole 50B.

The pivot restricting piece 41B has a handle pivoting restricting portion 410B corresponding to the handle stopper 30E, is movably arrange in the second internal space 51A of the case 5A and is coupled with the plunger block 41C. The pivot restricting piece 41B moves to a position of restricting a pivotal movement of the door handle 30 by an insertion of the matching key K into the key insertion/extraction hole 50B, and the handle pivoting restricting portion 410B locks the handle stopper 30E for restricting the pivotal movement in a restoring direction of the door handle 30. In addition, the pivot restricting piece 41B is withdrawn back to a position of releasing a pivot restriction of the door handle 30 by pulling out the matching key K from the key insertion/extraction hole 50B, and the handle pivoting restricting portion 410B releases the locked state of the handle stopper 30E for pivotally returning the door handle 30.

A notched concave portion 411B facing a portion of the plunger block 41C and a pair of long holes 412B and 413B communicating with the notched concave portion 411B are provided at an end of the pivot restricting piece 41B on a plunger block side. A spring 7 for imparting a snapping force in a direction to proceed the pivot restricting piece 41B (a direction opposite to the plunger block 41C) is elastically mounted (arranged) between a bottom surface of the notched concave portion 411B and the plunger block 41C (a spring receiving portion 412C)

The plunger block 41C is arranged between the slide piece 41A and the pivot restricting piece 41B, and is movably housed in the second internal space 51A of the case 5A along two guide concave portions (not shown). The plunger block 41C is configured to press the pivot restricting piece 41B by receiving a pressing force form the slide piece 41A.

On one side end of the plunger block 41C, pins 410C, 411C each projecting on both side surfaces for freely fitting to each of the pair of long holes 412B and 413B are provided. In addition, on the one side end of the plunger block 41C, the concave spring receiving portion 412C opening on an end surface of pivot restricting piece side for receiving the spring 7 is provided. On another side end of the plunger block 41C, guide convex portions 413C and 414C each projecting on both side surfaces for fitting to both guide concave portions are provided. A spring 8 for imparting a snapping force in a direction to press-contact the slide piece 41A with the piece receiving portion 521A (to press the plunger block 41C on the slide piece side) are elastically mounted (arranged) between the other side end of the plunger block 41C and the spring receiving portion 520A of the case 5A.

Operation of the Vehicle Door Handle Device 40

Figure 14B:
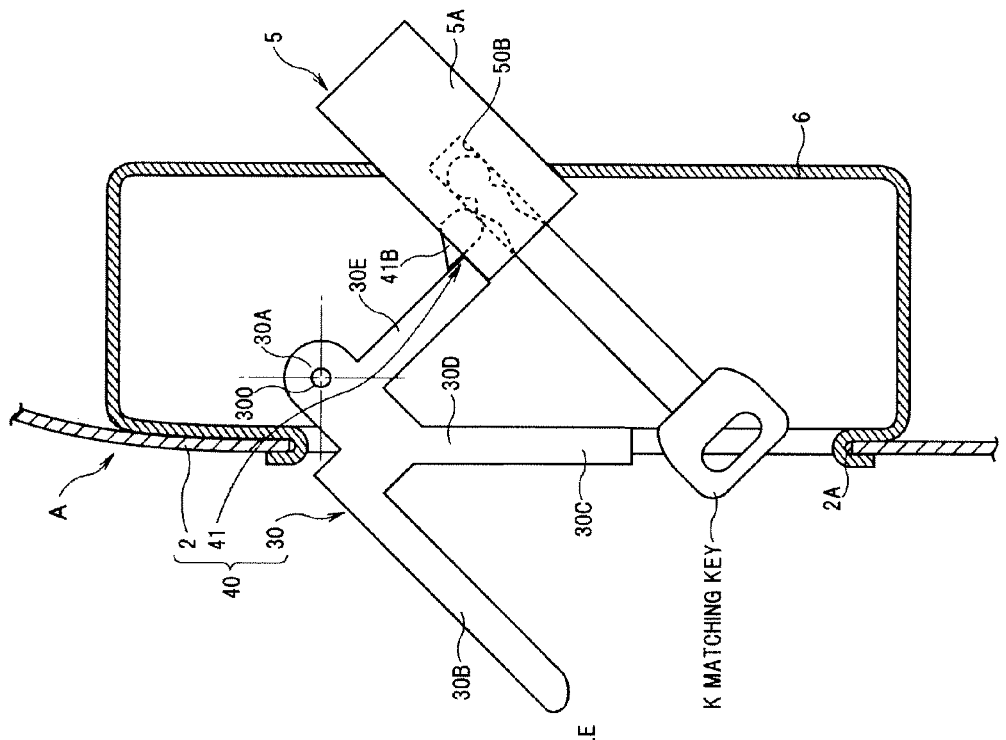
FIGS. 14A and 14B are explanatory cross sectional views showing an operation of the vehicle door handle device in the fourth embodiment of the invention.
Figure 14A:
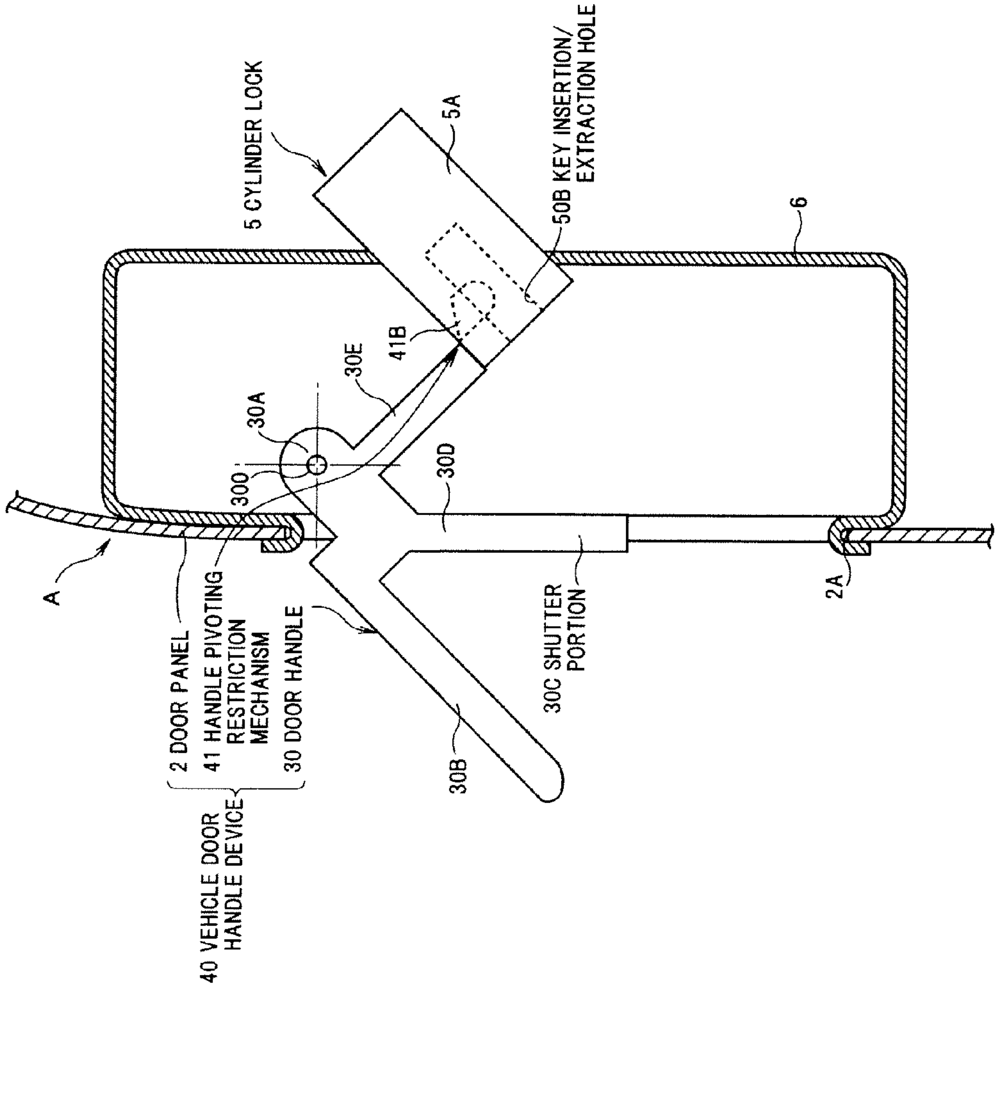
Figure 15A:
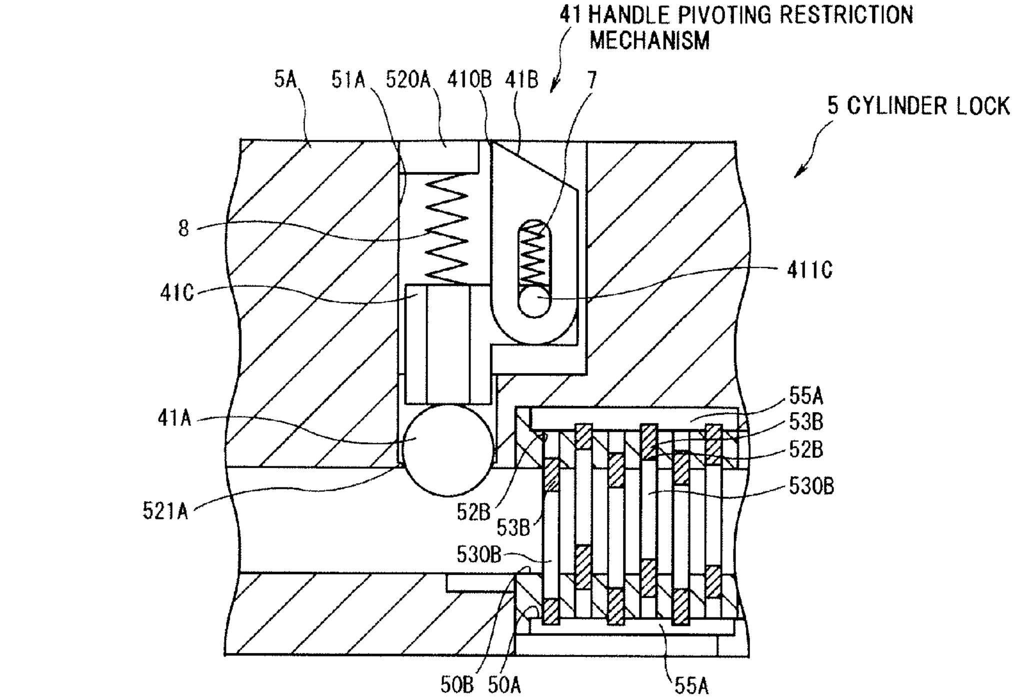
FIGS. 15A and 15B are explanatory cross sectional views showing an operation of a handle pivoting restriction mechanism in the vehicle door handle device in the fourth embodiment of the invention.
Figure 15B:
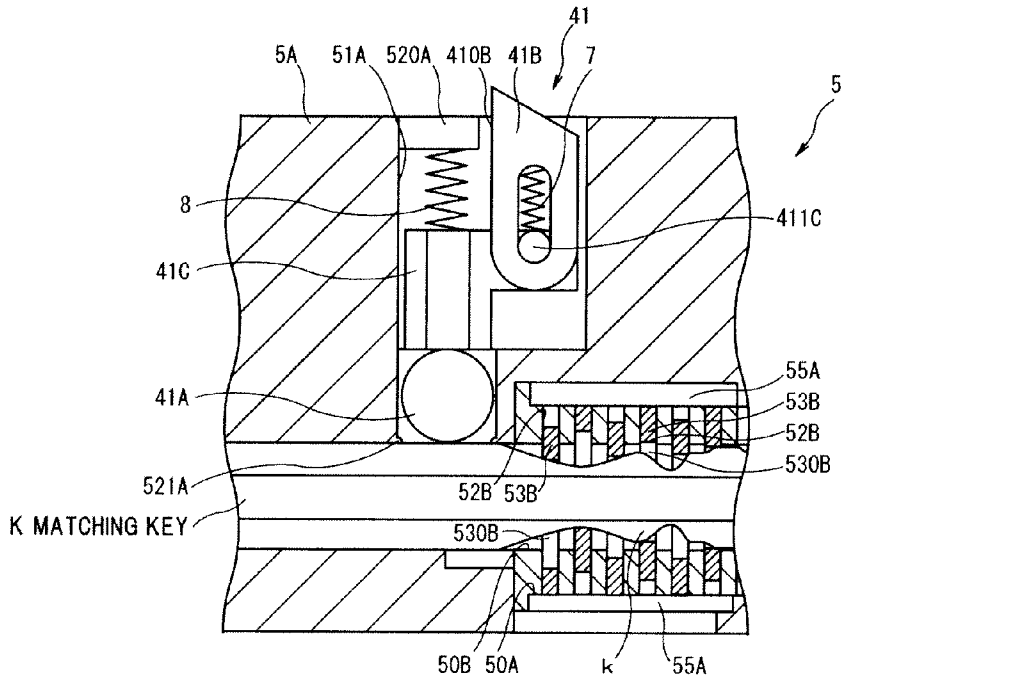

Next, the operation of the vehicle door handle device 40 in the embodiment will be explained in conjunction with FIGS. 14A, 14B, 15A and 15B. FIGS. 14A and 14B are explanatory cross sectional views showing an operation of the vehicle door handle device in the fourth embodiment of the invention. FIG. 14A shows a non-inserted state of a matching key at the time of pulling out a door handle and FIG. 14B shows an inserted state of the matching key at the time of pulling out a door handle, respectively. FIGS. 15A and 15B are explanatory cross sectional views showing an operation of a handle pivoting restriction mechanism in the vehicle door handle device in the fourth embodiment of the invention. FIG. 15A shows a non-inserted state of a matching key at the time of pulling out a door handle and FIG. 15B shows an inserted state of the matching key at the time of pulling out a door handle, respectively.

In order to switch the door locking mechanism from the locked state to the unlocked state in a closed state of the door panel 2, the door handle 30 is pulled out (pivotally operated) as shown in FIG. 14A, thereby pivoting the shutter portion 30C with the operating portion 30B. In this case, when the shutter portion 30C pivots, the key insertion/extraction hole 50B of the cylinder lock 5 (a key rotor 50) is opened.

Next, as shown in FIG. 14B, when the matching key K is inserted into the key insertion/extraction hole 50B of the key rotor 5B, the pivot restricting piece 41B of the handle pivoting restriction mechanism 41 proceeds to a position of restricting a pivotal movement in a restoring direction of the door handle 30, which results in that the handle pivoting restricting portion 410B is exposed outside the case 5A of the cylinder lock 5. In this case, when the matching key K is inserted into the key insertion/extraction hole 50B, since the one side edge of the matching key K presses the slide piece 41A toward the plunger block side, the slide piece 41A moves against a snapping force of the spring 8 from the withdrawn position shown in FIG. 15A to the proceeding position shown in FIG. 15B. Accordingly, the slide piece 41A presses the plunger block 41C, furthermore, the plunger block 41C presses the pivot restricting piece 41B, which results in that the plunger block 41C and the pivot restricting piece 41B move in a pressing direction thereof. As a result, even if an operator takes his hands off the door handle 30, since the pivotal movement of the handle stopper 30E thereof in the restoring direction of the door handle 30 is restricted by the handle pivoting restricting portion 410B of the pivot restricting piece 41B, an insertion and a subsequent pivotal operation of the matching key K in the key insertion/extraction hole 50B of the cylinder lock 5 (locking and unlocking of the door locking mechanism by the matching key K) is not necessary in a state that the operator holds the door handle 3.

In addition, the key fitting grooves 530B, 530B, - - - of the tumblers 53B, 53B, - - - are engaged with the convex portion k of the matching key K at each corresponding position by inserting the matching key K into the key insertion/extraction hole 50B of the key rotor 5B, accordingly, the tumblers 53B, 53B, - - - are withdrawn from the tumbler fitting holes 55A, 55A, which results in a pivotal state of the key rotor 5B.

Then, the matching key K is pivotally operated in a direction to release the locked state of the door locking mechanism. In this case, when the matching key K pivots, the pivotal force is transmitted to the door locking mechanism via a lever (not shown), accordingly, the door locking mechanism is switched from the locked state to the unlocked state.

Here, when the matching key K is pulled out from the key rotor 5B, the pivot restricting piece 41B is restored by the snapping force of the spring 8 and is housed in the case 5A, then, the restriction of the handle stopper 30E by the handle pivoting restricting portion 410B is released and the door handle 30 returns to the initial position.

After this, when the door handle 30 is operated in a direction to open the door panel 2 again, the door panel 2 is opened since the door locking mechanism is in the unlocked state.

Meanwhile, in order to switch the door locking mechanism from the unlocked state to the locked state in the closed state of the door panel 2, the door panel 2 is opened by pulling out (pivotally operating) the door handle 30 as shown in FIG. 14A, and the matching key K is inserted into the key insertion/extraction hole 50B of the key rotor 5B. Subsequently, the matching key K is pivotally operated and pulled out to the outside of the key rotor 5B, and the door panel 2 is closed again.

Effect of the Fourth Embodiment

According to the above-mentioned fourth embodiment, following effects can be obtained in addition to the effect of the third embodiment.

Since an insertion and a subsequent pivotal operation of the matching key K in the key insertion/extraction hole 50B of the cylinder lock 5 (locking and unlocking of the door locking mechanism by the matching key) is not necessary in the state that the operator holds the door handle 30, it is possible to simplify the locking and unlocking operation by the matching key K in the door locking mechanism.

Although the vehicle door handle device according to the present invention has been described based on the above preferred embodiment, the invention is not to be limited by the above embodiment and it is possible to implement in various features without going beyond a scope of the concept. For example, following variations can be made.

(1) In each embodiment (the first and second embodiments), although it is explained that the shutter portions 4A and 620A of the shutters 4 and 62 block off the key insertion/extraction hole 50B by contacting with the end surface of the cylinder lock 5 on the key insertion side (a periphery of the opening of the key insertion/extraction hole 50B), the present invention is not limited thereto. Hence, if each shutter is configured to block off a key insertion/extraction hole by interposing a sealing member, it is possible to enhance a sealing property by a shutter with respect to the key insertion/extraction hole compared with each embodiment.

(2) In each embodiment (the third and fourth embodiments), although it is explained that the operating portion 30B is formed of a member having a substantially L-shaped cross section, the present invention is not limited thereto. For example, a handle operating portion may be a substantially pointed-arch shape in cross section or in another shape, of course. Furthermore, a formation material thereof is not specifically limited and may be appropriately changed.

(3) In each embodiment (the first to fourth embodiments), although it is explained that the door locking mechanism in the automobile door panel is locked and unlocked, the present invention is not limited thereto. Hence, it may be the locking and unlocking of a door locking mechanism in other vehicle, and it is applicable for locking and unlocking a locking mechanism other than the door locking mechanism in the same way as the embodiment.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. A vehicle door handle device, comprising:

a cylinder lock for locking and unlocking a locking mechanism of an opening/closing panel; and a pair of pivot members pivotally attached to the opening/closing panel, wherein one pivot member of the pair of pivot members includes a shutter that opens and closes a key insert hole of the cylinder lock; and another pivot member of the pair of pivot members includes a pivotal force transmitting portion for transmitting a pivotal force in a direction to open the key insert hole to the one pivot member and an operating handle for opening and closing the opening/closing panel.

2. The vehicle door handle device according to claim 1, wherein the one pivot member comprises a single arm having a shutter portion for opening and closing the key insert hole and a pivotal force receiving portion corresponding to the pivotal force transmitting portion.

3. The vehicle door handle device according to claim 1, wherein the one pivot member comprises a first arm having a shutter portion for opening and closing the key insert hole and a second arm having a pivotal force receiving portion corresponding to the pivotal force transmitting portion; and a pivot fulcrum is arranged between the first arm and the second arm.

4. The vehicle door handle device according to claim 3, wherein the other pivot member has a pivot fulcrum on an axis line parallel to an axis line passing through the pivot fulcrum of the one pivot member.

5. The vehicle door handle device according to claim 3, wherein the pivotal force transmitting portion of the other pivot member comprises a cam.

6. The vehicle door handle device according to claim 1, wherein the one pivot member blocks off the key insert hole by interposing a sealing member between the one pivot member and an end surface of the cylinder lock on a key insertion side.

7. A vehicle door handle device, comprising:

a cylinder lock for locking and unlocking a locking mechanism of an opening/closing panel; and a pair of pivot members pivotally attached to the opening/closing panel, wherein one pivot member of the pair of pivot members includes a shutter that opens and closes a key insert hole of the cylinder lock, and another pivot member of the pair of pivot members includes an operating handle for opening and closing the opening/closing panel.

* * * * *